US011954473B2

(12) United States Patent
Myers et al.

(10) Patent No.: US 11,954,473 B2
(45) Date of Patent: Apr. 9, 2024

(54) DEPLOYMENT ARCHITECTURE FOR MULTI-TENANT CLOUD COMPUTING SYSTEMS

(71) Applicant: MicroStrategy Incorporated, Vienna, VA (US)

(72) Inventors: Clayton Myers, Oak Hill, VA (US); Jay Indravadan Shah, Aldie, VA (US); Shreyas Shah, Vienna, VA (US); Michael David Hudson, Roanoke, VA (US); Timothy Lang, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 79 days.

(21) Appl. No.: 17/479,585

(22) Filed: Sep. 20, 2021

(65) Prior Publication Data

US 2023/0088202 A1 Mar. 23, 2023

(51) Int. Cl.
*G06F 8/61* (2018.01)

(52) U.S. Cl.
CPC ..................................... *G06F 8/63* (2013.01)

(58) Field of Classification Search
CPC ........................................................ G06F 8/63
See application file for complete search history.

(56) References Cited

U.S. PATENT DOCUMENTS

| 6,334,158 | B1 | 12/2001 | Jennyc et al. |
| 6,339,795 | B1 | 1/2002 | Narurkar et al. |
| 6,691,245 | B1 | 2/2004 | DeKoning |
| 7,454,427 | B2 | 11/2008 | Jackson |
| 7,457,248 | B1 | 11/2008 | Ali et al. |
| 7,784,049 | B1 | 8/2010 | Gandler |
| 7,917,617 | B1 | 3/2011 | Ponnapur et al. |
| 8,135,751 | B2 | 3/2012 | Engquist et al. |
| 8,140,624 | B2 | 3/2012 | Gingell et al. |
| 8,238,913 | B1 | 8/2012 | Bhattacharyya et al. |
| 8,285,681 | B2 | 10/2012 | Prahlad et al. |

(Continued)

OTHER PUBLICATIONS

Vicente et al., "A framework for assessing the scale of influence of environmental factors on ecological patterns", Nov. 2014, Elsevier (Year: 2014).*

(Continued)

*Primary Examiner* — Wei Y Zhen
*Assistant Examiner* — Junchun Wu
(74) *Attorney, Agent, or Firm* — Fish & Richardson P.C.

(57) ABSTRACT

Methods, systems, and apparatus, including computer programs encoded on computer-storage media, for a deployment architecture for multi-tenant cloud computing systems. In some implementations, a first cluster of processing nodes is configured to run tenant computing environments on behalf of different tenants. A second cluster of processing nodes runs a deployment controller configured to manage and monitor tenant computing environments allocated for the first cluster of processing nodes. A pool of unassigned computing environments is hosted in the first cluster of processing nodes. After receiving a request for a new environment, the deployment controller running in the second cluster of processing nodes coordinates with one or more modules running in the first cluster of processing nodes to update and assign one of the previously unassigned computing environments to be used.

18 Claims, 4 Drawing Sheets

(56) References Cited

U.S. PATENT DOCUMENTS

| | | | |
|---|---|---|---|
| 8,572,138 B2 | 10/2013 | Sundar et al. | |
| 8,595,331 B2 | 11/2013 | Henseler et al. | |
| 8,954,557 B2 | 2/2015 | Gusev et al. | |
| 8,959,223 B2 | 2/2015 | Sloma et al. | |
| 9,189,294 B2 | 11/2015 | Considine et al. | |
| 9,270,449 B1 | 2/2016 | Tribble et al. | |
| 9,367,305 B1 | 6/2016 | Kumar et al. | |
| 9,674,294 B1 | 6/2017 | Gonthier et al. | |
| 9,767,312 B2 | 9/2017 | Sahoo et al. | |
| 9,928,210 B1 | 3/2018 | Zhang et al. | |
| 9,959,104 B2 | 5/2018 | Chen et al. | |
| 9,965,261 B2 | 5/2018 | Chen et al. | |
| 9,986,427 B2 | 5/2018 | Kimpe | |
| 10,002,247 B2 | 6/2018 | Suarez et al. | |
| 10,007,509 B1 | 6/2018 | Quershi et al. | |
| 10,101,985 B1 | 10/2018 | Prakash et al. | |
| 10,120,907 B2 | 11/2018 | De Castro et al. | |
| 10,135,837 B2 | 11/2018 | Lewis et al. | |
| 10,169,023 B2 | 1/2019 | Ciano et al. | |
| 10,169,028 B2 | 1/2019 | Htay | |
| 10,191,778 B1 | 1/2019 | Yang et al. | |
| 10,225,335 B2 | 3/2019 | Fu et al. | |
| 10,237,118 B2 | 3/2019 | Du et al. | |
| 10,241,778 B2 | 3/2019 | Emeis et al. | |
| 10,244,034 B2 | 3/2019 | Joshi et al. | |
| 10,261,782 B2 | 4/2019 | Suarez et al. | |
| 10,310,949 B1 | 6/2019 | Chakraborty et al. | |
| 10,318,280 B2 | 6/2019 | Islam et al. | |
| 10,356,214 B2 | 7/2019 | Joshi et al. | |
| 10,389,582 B1 | 8/2019 | Fakhouri et al. | |
| 10,389,598 B2 | 8/2019 | Padala et al. | |
| 10,528,367 B1 | 1/2020 | Liu et al. | |
| 10,552,774 B2 | 2/2020 | Shih et al. | |
| 10,599,423 B2 * | 3/2020 | Coleman | G06F 8/63 |
| 10,628,228 B1 * | 4/2020 | Theunissen | H04L 43/0876 |
| 10,671,368 B2 | 6/2020 | Brealey et al. | |
| 10,691,514 B2 | 6/2020 | McClory et al. | |
| 10,698,742 B2 | 6/2020 | Barsness et al. | |
| 10,708,082 B1 | 7/2020 | Bakiaraj et al. | |
| 10,725,775 B2 | 7/2020 | Suarez et al. | |
| 10,740,081 B2 * | 8/2020 | Newell | G06F 8/60 |
| 10,979,859 B2 | 4/2021 | Botti et al. | |
| 11,023,270 B2 | 6/2021 | Mahajan et al. | |
| 11,029,977 B2 | 6/2021 | Baneva et al. | |
| 11,106,455 B2 | 8/2021 | Myers et al. | |
| 11,277,471 B2 | 3/2022 | Brandwine et al. | |
| 11,288,053 B2 | 3/2022 | Myers et al. | |
| 11,526,374 B2 * | 12/2022 | Soryal | G06F 3/0632 |
| 2002/0157089 A1 | 10/2002 | Patel et al. | |
| 2005/0060722 A1 | 3/2005 | Rochette et al. | |
| 2008/0109448 A1 | 5/2008 | Aboel-Nil et al. | |
| 2008/0216056 A1 | 9/2008 | Bate et al. | |
| 2008/0243660 A1 | 10/2008 | Amemiya et al. | |
| 2009/0070462 A1 | 3/2009 | Saenz et al. | |
| 2012/0117620 A1 | 5/2012 | Cassidy | |
| 2013/0080514 A1 | 3/2013 | Gupta et al. | |
| 2013/0339299 A1 | 12/2013 | Muller et al. | |
| 2014/0020048 A1 | 1/2014 | Snodgrass | |
| 2014/0089033 A1 | 3/2014 | Snodgrass | |
| 2014/0365626 A1 * | 12/2014 | Radhakrishnan | G06F 9/45558 709/222 |
| 2015/0019488 A1 | 1/2015 | Balch et al. | |
| 2015/0135185 A1 | 5/2015 | Sirota et al. | |
| 2015/0319192 A1 * | 11/2015 | Cabrera | H04L 63/10 726/1 |
| 2015/0326432 A1 | 11/2015 | Fujie et al. | |
| 2015/0373097 A1 | 12/2015 | Konkus et al. | |
| 2016/0044040 A1 | 2/2016 | Caffary, Jr. | |
| 2016/0055067 A1 | 2/2016 | Bensinger | |
| 2016/0105393 A1 * | 4/2016 | Thakkar | H04L 67/125 709/220 |
| 2016/0139887 A1 | 5/2016 | Pudiyapura et al. | |
| 2016/0162277 A1 | 6/2016 | Fenzl et al. | |
| 2016/0335106 A1 | 11/2016 | Behere et al. | |
| 2016/0335108 A1 | 11/2016 | Ryu et al. | |
| 2016/0350205 A1 | 12/2016 | Acharya et al. | |
| 2017/0090972 A1 | 3/2017 | Ryu et al. | |
| 2017/0093742 A1 | 3/2017 | Cropper et al. | |
| 2017/0093923 A1 | 3/2017 | Duan | |
| 2017/0147319 A1 | 5/2017 | Riek et al. | |
| 2017/0154017 A1 | 6/2017 | Kristiansson et al. | |
| 2017/0177860 A1 | 6/2017 | Suarez et al. | |
| 2017/0185488 A1 | 6/2017 | Kumarasamy et al. | |
| 2017/0223117 A1 | 8/2017 | Messerli et al. | |
| 2017/0300311 A1 | 10/2017 | Lopez et al. | |
| 2017/0315795 A1 | 11/2017 | Keller | |
| 2018/0013616 A1 | 1/2018 | Abadi et al. | |
| 2018/0060132 A1 | 3/2018 | Maru et al. | |
| 2018/0075086 A1 | 3/2018 | Yam et al. | |
| 2018/0088926 A1 | 3/2018 | Abrams | |
| 2018/0088935 A1 | 3/2018 | Church et al. | |
| 2018/0095778 A1 | 4/2018 | Aydelott et al. | |
| 2018/0095973 A1 | 4/2018 | Huang et al. | |
| 2018/0136931 A1 | 5/2018 | Hendrich et al. | |
| 2018/0157516 A1 | 6/2018 | Kristiansson et al. | |
| 2018/0173502 A1 | 6/2018 | Biskup et al. | |
| 2018/0173522 A1 | 6/2018 | Hamill et al. | |
| 2018/0205652 A1 | 7/2018 | Saxena | |
| 2018/0285199 A1 | 10/2018 | Mitkar et al. | |
| 2018/0285210 A1 | 10/2018 | Mitkar et al. | |
| 2018/0285353 A1 | 10/2018 | Rao et al. | |
| 2018/0302335 A1 | 10/2018 | Gao et al. | |
| 2018/0321993 A1 | 11/2018 | McClory et al. | |
| 2018/0341471 A1 | 11/2018 | Stefanov et al. | |
| 2018/0373885 A1 * | 12/2018 | Arad | G06F 21/6254 |
| 2019/0034313 A1 | 1/2019 | Vedurumudi et al. | |
| 2019/0050680 A1 | 2/2019 | Waugh et al. | |
| 2019/0095241 A1 * | 3/2019 | Ago | G06F 16/24573 |
| 2019/0095254 A1 | 3/2019 | Rao | |
| 2019/0109857 A1 | 4/2019 | Caffary, Jr. | |
| 2019/0123956 A1 | 4/2019 | Satapathy et al. | |
| 2019/0132329 A1 | 5/2019 | Verberkt et al. | |
| 2019/0163559 A1 | 5/2019 | Takahashi et al. | |
| 2019/0190922 A1 * | 6/2019 | Cleaver | H04L 63/102 |
| 2019/0208031 A1 | 7/2019 | Bennet et al. | |
| 2019/0230130 A1 | 7/2019 | Beckman et al. | |
| 2019/0235897 A1 | 8/2019 | Goel | |
| 2019/0236844 A1 | 8/2019 | Balasian et al. | |
| 2019/0260716 A1 | 8/2019 | Lerner | |
| 2019/0278669 A1 | 9/2019 | Mueller-Wicke et al. | |
| 2019/0303541 A1 | 10/2019 | Reddy et al. | |
| 2019/0354389 A1 | 11/2019 | Du et al. | |
| 2019/0392045 A1 | 12/2019 | De Lima Junior et al. | |
| 2020/0067763 A1 | 2/2020 | Vytla | |
| 2020/0099773 A1 | 3/2020 | Myers et al. | |
| 2020/0250009 A1 * | 8/2020 | Jaeger | H04L 63/20 |
| 2020/0356806 A1 | 11/2020 | Li et al. | |
| 2020/0379794 A1 | 12/2020 | Kim | |
| 2020/0394120 A1 | 12/2020 | Salmi et al. | |
| 2021/0042141 A1 | 2/2021 | De Marco et al. | |
| 2021/0048995 A1 | 2/2021 | Myers et al. | |
| 2021/0048998 A1 | 2/2021 | Myers et al. | |
| 2021/0049002 A1 | 2/2021 | Myers et al. | |
| 2021/0064262 A1 | 3/2021 | Myers et al. | |
| 2021/0067486 A1 * | 3/2021 | Souhrada | H04L 12/4641 |
| 2021/0240558 A1 * | 8/2021 | Balaka | H04L 41/0895 |
| 2021/0240734 A1 | 8/2021 | Shah et al. | |
| 2022/0004381 A1 | 1/2022 | Myers et al. | |
| 2022/0091830 A1 | 3/2022 | Ionescu et al. | |
| 2022/0188170 A1 * | 6/2022 | Smith | G06F 9/547 |
| 2022/0201073 A1 * | 6/2022 | Mallikarjuna Durga Lokanath | G06F 9/45558 |
| 2022/0229649 A1 | 7/2022 | Myers et al. | |
| 2022/0334725 A1 | 10/2022 | Mertes et al. | |
| 2022/0350642 A1 * | 11/2022 | Poddar | G06F 8/71 |
| 2022/0391523 A1 * | 12/2022 | Kwong | G06F 21/6218 |
| 2023/0244466 A1 | 8/2023 | Shah et al. | |

OTHER PUBLICATIONS

He et al., "A Novel Task-Duplication Based Clustering Algorithm for Heterogeneous Computing Environments", Jan. 2019, IEEE, vol. 30, No. 1 (Year: 2019).*

(56) References Cited

OTHER PUBLICATIONS

Mahmud et al., "Latency-Aware Application Module Management for Fog Computing Environments", 2018, ACM (Year: 2018).*
Sommer et a;., "Predictive Load Balancing in Cloud Computing Environments based on Ensemble Forecasting", 2016, IEEE (Year: 2016).*
Garg et al., "Reliability and energy efficient workflow scheduling in cloud environment", Feb. 2019, Springer (Year: 2019).*
Khemka et al., "Resource Management in Heterogeneous Parallel Computing Environments with Soft and Hard Deadlines", Jun. 2105, The XI Metaheuristics International Conference (Year: 2015).*
bmc.com [online], "Introduction to Kubernetes Helm Charts," Apr. 10, 2020, retrieved on Aug. 30, 2022, retrieved from URL <https://www.bmc.com/blogs/kubernetes-helm-charts/>, 4 pages.
developer.ibm.com [online], "Deploy a MongoDB replica set using the IBM Cloud Kubernetes Service," Mar. 15, 2018, retrieved on Oct. 25, 2019, retrieved ffrom URL <https://developer.IBM.com/tutorials/cl-deploy-mongodb-replica-set-using-IBM-cloud-container-service/>, 14 pages.
developer.mozilla.org [online], "Package management basics," upon information and belief, available no later than Jul. 5, 2020, retrieved on Aug. 30, 2022, retrieved from URL <https://developer.mozilla.org/en-us/docs/Learn/Tools_and_testing/Understanding_client-side_tools/Package_management>, 9 pages.
Doc-archives.microstrategy.com [online], "Installing and Configuring MicroStrategy Library," Jun. 2017, retrieved on Oct. 25, 2019, retrieved from URL <https://doc-archives.microstrategy.com/producthelp/10.10/InstallConfig/WebHelp/Lang_1033/Content/install_config_library.htm>, 2 pages.
docs.docker.com [online], "Get Started, Part 1: Orientation and setup," 2017, retrieved on Oct. 25, 2019, retrieved from URL <https://docs.docker.com/get-started/>, 6 pages.
Dyn.com [online], "Kubernetes: The Difference Between Containers and Virtual Machines," Feb. 20, 2018, retrieved on Oct. 25, 2019, retrieved from URL <https://dyn.com/blog/kubernetes-the-difference-between-containers-and-virtual-machines/>, 8 pages.
edureka.co [online], "Docker Tutorial—Introduction to Docker & Containerization," 2017, retrieved on Oct. 25, 2019, retrieved from URL <https://www.edureka.co/blog/docker-tutorial>, 10 pages.
ElectronicDesign.com [online], "What's the Difference Between Containers and Virtual Machines?" Jul. 15, 2016, retrieved on Nov. 12, 2019, retrieved from URL <http://electronicdesign.com/dev-tools/what-s-difference-between-containers-and-virtualmachines>, 3 pages.
kubernetes.io [online], "Concepts Underlying the Cloud Controller Manager," May 2019, retrieved on Jun. 20, 2019, retrieved from URL <https://kubernetes.io/docs/concepts/architecture/cloud-controller/>, 9 pages.
kubernetes.io [online], "StatefulSet," Jun. 2019, retrieved on Jun. 20, 2019, retrieved from URL <https://kubernetes.io/docs/concepts/workloads/controllers/statefulset/>, 9 pages.
Linkedin.com [online], "Moving MicroStrategy to a Docker/Kubernetes infrastructure," Jan. 2018, retrieved from Oct. 25, 2019, retrieved from URL <https://www.linkedin.com/pulse/moving-microstrategy-dockerkubernetes-infrastructure-montero/>, 3 pages.

Linuxize.com [online], "How To Remove Docker Containers, Images, Volumes, and Networks," Oct. 2018, retrieved on Oct. 25, 2019, retrieved from URL <https://linuxize.com/post/how-to-remove-docker-images-containers-volumes-and-networks/#remove-one-or-more-containers>, 11 pages.
Ma et al., "Efficient Service Handoff Across Edge Servers via Docker Container Migration," SEC '17: Proceedings of the Second ACM/IEEE Symposium on Edge Computing, Oct. 2017, 11:1-13.
Medium.com [online], "Understanding the Kubernetes Manifest," Dec. 1, 2019, retrieved on Aug. 30, 2022, retrieved from URL <https://medium.com/@sujithar37/understanding-the-kubernetes-manifest-97f44acc2cb9>, 7 pages.
MicroStrategy.com [online], "MicroStrategy Intelligence Server," Apr. 2019, retrieved on Oct. 25, 2019, retrieved from URL <https://www2.microstrategy.com/producthelp/10.4/ProjectDesignGuide/WebHelp/Lang_1033/Content/ProjectDesign/MicroStrategy_Intelligence_Server.htm>, 2 pages.
MicroStrategy.com [online], "Microstrategy on Kubernetes," 2019, retrieved on Oct. 25, 2019, retrieved from URL <https://www.microstrategy.com/getmedia/d99b44dc-ec44-451b-a5a3-3db7160282f0/Genesys-How-to-run-MicroStrategy-on-Kubernetes>, 10 pages.
Singh et al., "Container-based Microservice Architecture for Cloud Applications," 2017 International Conference on Computing, Communication and Automation (ICCCA 2017), May 2017, 847-852.
stackoverflow.com [online], "What's the difference between ClusterIP, NodePort and LoadBalancer service types in Kubernetes?" Jan. 2017, retrieved on Oct. 25, 2019, retrieved from URL <https://stackoverflow.com/questions/41509439/whats-the-difference-between-clusterip-nodeport-and-loadbalancer-service-types/52241241#52241241>, 6 pages.
Tao et al., "Dynamic Resource Allocation Algorithm for Container-based Service Computing," 2017 IEEE 13th International Symposium on Autonomous Decentralized Systems, Mar. 2017, 61-67.
V2.helm.sh [online], "Charts," upon information and belief, available no later than May 13, 2020, retrieved on Aug. 30, 2022, retrieved from URL <https://v2.helm.sh/docs/developing_charts/>, 61 pages.
Wikipedia.org [online], "Docker (software)," Mar. 2013, retrieved on Oct. 25, 2019, retrieved from URL <https://en.wikipedia.org/wiki/Docker (software)>, 8 pages.
Wikipedia.org [online], "Online analytical processing," Mar. 2018, retrieved on Mar. 19, 2020, retrieved from URL <https://en.wikipedia.org/wiki/Online_analytical processing>, 14 pages.
Wikipedia.org [online], "OS-level virtualization," Aug. 2006, retrieved on Oct. 25, 2019, retrieved from URL <https://en.wikipedia.org/wiki/OS-level virtualization>, 4 pages.
Wikipedia.org [online], "Package manager," upon information and belief, available no later than Apr. 1, 2002, retrieved on Aug. 30, 2022, retrieved from URL <https://en.wikipedia.org/wiki/Package_manager>, 10 pages.
Wikipedia.org [online], "System image," Feb. 2013, retrieved Oct. 25, 2019, retrieved from URL <https://en.wikipedia.org/wiki/System_image>, 2 pages.
Xu et al., "Mining Container Image Repositories for Software Configuration and Beyond," 2018 ACM/IEEE 40th International Conference on Software Engineering: New Ideas and Emerging Results (ICSE-NIER'18), May 2018, 49-52.

* cited by examiner

DEPLOYMENT ARCHITECTURE FOR MULTI-TENANT CLOUD COMPUTING SYSTEMS

BACKGROUND

The present specification relates to architectures for deploying computing environments in cloud computing systems.

Cloud computing systems enable the remote hosting of many server functions that were previously performed using dedicated on premises computing hardware. The process of generating and configuring server environments and other computing environments can still take considerable amounts of time, even when software images and default settings are known in advance.

SUMMARY

In some implementations, a computer system includes multiple clusters of computing nodes that are configured to efficiently create and deploy computing environments. The computer system can operate as a multi-tenant system, enabling many different users to easily create and deploy computing environments on a shared set of clusters. To facilitate efficient management of many computing environments, two types of cluster can be used, a management cluster and one or more environment clusters. The management cluster can run a deployment controller, which can manage user requests and direct the creation of computing environments. The environment clusters each run a configuration module to receive and carry out management actions instructed by the deployment controller.

This arrangement provides a highly scalable system, where the deployment controller can manage multiple different environment clusters, including performing routing and load balancing among clusters at different geographical areas. In addition, the operations to configure individual environments are handled by the configuration module within each environment cluster, abstracting these operations from the deployment controller and handling them locally without the overhead of managing them through the deployment controller. The deployment controller and the configuration module communicate through predetermined messaging channels, such as using a representational state transfer (REST) application programming interface. This enables the deployment controller to pass instructions to the configuration modules of various environment clusters and also to receive status information from the environment clusters.

Enterprise computing systems often include complex arrangements of many interacting components, such as file system managers, document libraries, databases, application servers, web servers, and more. Implementing enterprise systems as software-as-a-service (SaaS) can provide great benefits for the customers that use the systems as well as the providers. However, deploying these complex systems has often been time-consuming and resource intensive. For example, the conventional process of creating a new server environment and deploying it for users can take several hours, even when many or all of the steps are automated.

To make the creation and deployment of remotely hosted enterprise software faster and more efficient, an arrangement of multiple computing clusters can be used. One type of cluster, an environment cluster, is configured to host computing environments for different tenants in a multi-tenant system. A configuration module in the environment cluster is configured to create and manage computing environments within the environment cluster. Another type of cluster, a management cluster, includes a deployment controller that maintains and provides status information about environments, handles requests from users, and sends instructions to the configuration modules in the environment clusters.

The environment modules can be arranged to provide new, fully-functional server environments with very low latency. The configuration module in each environment module can avoid much of the latency involved in generating a new environment by maintaining a pool of unassigned environments. The unassigned environments can each include separate copies of the applications, drivers, and other software needed to run. For example, each of the unassigned environments can include a collection of containers configured to interact with each other, with the containers already loaded from software images and ready for execution before requests for new tenant computing environments are received. When the deployment controller indicates that a new computing environment is needed, the configuration module can update one of the unassigned environments to link it with the appropriate user account and data sources. This effectively uses pre-generated environments to avoid the delays that would otherwise occur while performing operations to create containers, load software images, integrate and test dependencies, and so on.

In some implementations, a method performed by one or more computers includes: providing, by the one or more computers, a first cluster of processing nodes configured to run tenant computing environments on behalf of different tenants; providing, by the one or more computers, a second cluster of processing nodes running a deployment controller configured to manage tenant computing environments allocated for the first cluster of processing nodes; maintaining, by the one or more computers, a pool of unassigned computing environments to use in responding to later-received requests for tenant computing environments, the unassigned computing environments being hosted in the first cluster of processing nodes; receiving, by the one or more computers, a request for a new tenant computing environment, the request being provided over a communication network to the deployment controller through an application programming interface (API); and generating, by the one or more computers, a new tenant computing environment in response to the request, wherein the deployment controller running in the second cluster of processing nodes coordinates with one or more modules running in the first cluster of processing nodes to assign one of the unassigned computing environments is made available as the new tenant computing environment in response to the request.

In some implementations, the tenant computing environments operate in separate namespaces in the first cluster of processing nodes, and wherein each environment includes a separate instance of application software of the environments.

In some implementations, each of the unassigned computing environments includes a same set of multiple containers, wherein, in each of the unassigned computing environments, the set of multiple containers is configured to operate together to provide one or more applications.

In some implementations, the containers of the respective unassigned computing environments in the pool are maintained in running state or paused state until assigned to become tenant computing environments.

In some implementations, providing, in response to the request, a reference specifying an address providing access to the new tenant computing environment.

In some implementations, the method includes: monitoring a number of unassigned computing environments are available in the first cluster of processing nodes; and based on the monitoring, generating one or more additional unassigned computing environments to maintain at least a minimum number of unassigned computing environments available.

In some implementations, the method includes determining a number of unassigned computing environments available; determining, based on a comparison of the number of unassigned computing environments with a predetermined minimum threshold number, that the number of unassigned computing environments is less than the predetermined minimum threshold number; and in response to determining that the number of unassigned computing environments is less than the predetermined minimum threshold, generating a number of additional unassigned computing environments to increase the number to meet or exceed the predetermined minimum threshold number, each of the additional unassigned computing environments being generated to include contents of a same set of software images.

In some implementations, the unassigned computing environments have each been configured with dependencies meet to enable the unassigned computing environments to access one or more third-party systems or interfaces.

In some implementations, the method includes running a configuration module in the first cluster of processing nodes, the configuration module being configured to receive instructions generated by the deployment controller in response to requests the deployment controller received through the API; and running a monitoring module in the in the first cluster of processing nodes along with one or more tenant computing environments, the configuration module being configured to monitor computing environments in the first cluster of processing nodes and provide status information about the computing environments to the deployment controller.

In some implementations, the deployment controller manages multiple different first clusters of processing nodes, each of the first clusters hosting a different set of computing environments, and each of the first clusters running its own configuration module and monitoring module for managing computing environments within the first cluster.

In some implementations, generating the new tenant computing environment comprises updating a particular environment of the unassigned computing environments by: assigning to the particular environment a user account for a user associated with the request; and adding one or more links to a data source associated with the user.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
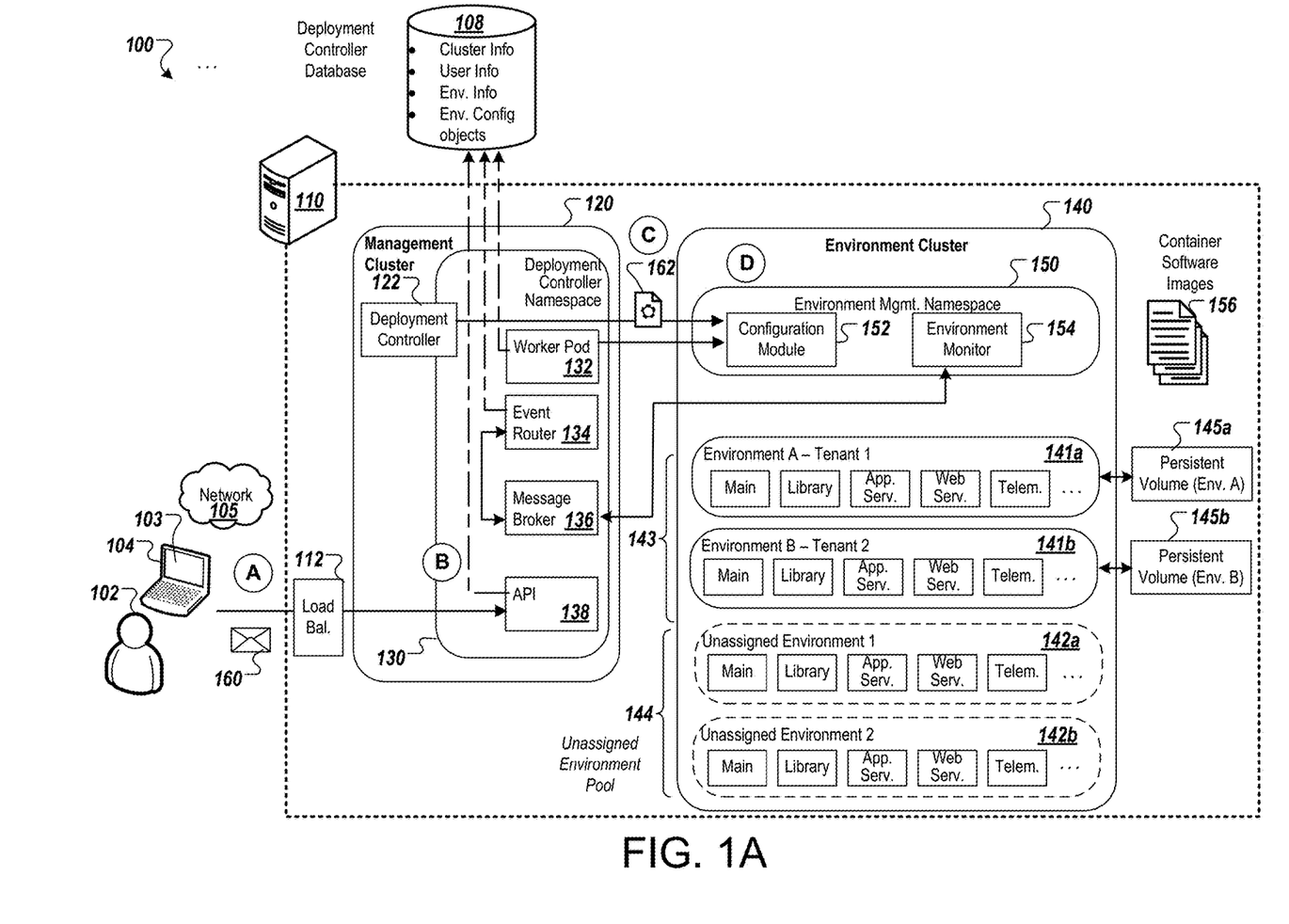
FIGS. 1A-1B are diagrams showing an example of a system for deploying computing environments.

FIG. 1 is a diagram showing an example of a system 100 for deploying computing environments. The system 100 includes a computer system 110, which includes multiple clusters 120, 140 of processing nodes. The clusters include a management cluster 120 and one or more environment clusters 140. The system 110 is a multi-tenant system that can create and host computing environments, e.g., cloud-computing-based server environments, for multiple different tenants. The system 110 divides various functions used in creating and managing between the management cluster and the environment cluster 140, allowing the system 110 to fulfill requests for new computing environments very quickly. The arrangement also enables more efficient scaling and load balancing across tenants, environments, and clusters.

The system 110 provides a very simple experience for users to create and deploy computing environments. A user 102 can log in to the system 110, using a user interface 103 of a native application or web-based application, and request that a new environment be created. This provides a request from the user's device 104 to the system 110 over a communication network 105, which can include the Internet. The system 110 then creates and deploys the requested environment, performing the hosting and management of the environment for the user 102. The system 110 returns data enabling the user 102 to access the new environment. In some implementations, this data is provided in the form of a reference, such as a hyperlink or uniform resource identifier (URI), that the user can select to access the environment. In some implementations, the new environment can be made active and automatically added to a management interface, e.g., listed on the user interface 103, for the user 102 to further configure and interact with. Once the new computing environment is created, the user 102, as an administrator, may assign other users to interact with the new environment and further customize the environment's behavior.

The system 110 deploys each new computing environment with separate instances of the applications and software modules needed. In some multi-tenant systems, a single application or software infrastructure is shared by many tenants, with security boundaries to keep data from different tenants separated. By contrast, the system 110 is configured to deploy a full instance of the software infrastructure for each customer or each environment. This creates environments that each separately run the copies of the software that are completely logically independent. For example, each environment created can have its own application server module, web server module, database server module, and so on, even though the environments are hosted together on the same cluster 140 of computing nodes. The environments can be hosted in separate namespaces in the same cluster 140, and can be monitored and managed, at least in part, by other software running in the same cluster 140.

Hosting independent copies of the software in each environment improves the management of the different environments. It also provides higher performance and higher efficiency, with the ability to decouple the load or demand of different environments of different customers and to provide more effective load balancing. In shared-application multi-tenancy, high loads from a few tenants can create bottlenecks that impact other tenants, as certain application features or resources are saturated. With each environment including separate instances of applications and other software, the system 110 can better isolate the impact of high loads to the environments creating those loads, as well as selectively allocate additional resources for the environments where it is needed.

One of the techniques that the system 110 employs to improve the deployment of environments is an architecture using multiple types of interacting clusters, with functions used in creating, monitoring, adjusting, and otherwise managing the environments being divided between the different clusters. The system 110 can divide the functions for managing and deploying tenant computing environments among multiple different clusters of processing nodes. For example, a first cluster hosts the tenant environments themselves, and a separate second cluster hosts the higher-level management components. As noted above, the system 110 has a management cluster 120 and one or more environment clusters 140. Each cluster may include many different processors or computers, often including dozens of networked processors or computers.

The clusters 120, 140 can be geographically distributed, e.g., with each cluster being operated at different sites, datacenters, or other locations. For example, a management cluster 120 may be used to manage environments in various environment clusters 140 that may be located in different cities or countries. Multiple management deployment controllers 120 can be created to manage different sets of environment clusters 140. In some implementations, the clusters 120, 140 can be Kubernetes clusters, e.g., managed using the Kubernetes open-source platform. The system 110 may additionally or alternatively carry out operations to manage the clusters 120, 140 with other cluster managements systems, such as Docker Swarm, Nomad, Rancher, Apache Mesos, etc. In some implementations, the clusters 120, 140 are formed of distinct sets of computers or processors. In other implementations, the clusters 120, 140 may be implemented through cloud-computing resources or virtualized.

The management cluster 120 runs a deployment controller 122, which can be an application that manages the allocation of environments across different environment clusters 140. The deployment controller 122 hosts REST APIs to enable environment deployment and management. The deployment controller 122 is part of the management cluster 120 and is independently scalable. This automatic scalability (e.g., in allocating more RAM, CPUs, and other resources as needed), enables the deployment controller 122 to better handle potential spikes in the volume of API requests. A major function of the deployment controller 122 is to delegate workflows to the respective configuration modules of environment clusters 140 so the appropriate environments are generated and made available. The deployment controller 122 delegates environment creation, termination, and other management functions to configuration module 152 deployed in same environment cluster 140 as the environment to be created or managed.

The deployment controller 122 can handle load balancing among environment clusters 140, the allocation of computing resources among environment clusters 140, the distribution of tasks to the environment clusters 140, verifying authentication of requests received through the API 138, and other functions. The deployment controller 122 then provides instructions to local management software running on the environment clusters 140 to carry out operations that fulfill the requests through the API 138.

The deployment controller 122 receives and responds to requests from tenants, as well as tracks the status of existing containers and instructs the environment clusters 140 to manage the computing environments they host. The deployment controller 122 can operate together with a collection of other containers or services that operate together to carry out management functions. These elements include a worker pod 132, an event router 134, a message broker 136, and an application programming interface (API) 138. The elements 132, 134, 136, and 138 can all operate in a deployment controller namespace 130 within the management cluster 120, keeping the operations separate from other functionality that may also be running on the management cluster 120.

The worker pod 132 includes and is configured to run periodic or scheduled tasks and workflows. Jobs that ran in time intervals like updating metrics or pool monitoring, can be handled by the worker pod rather than the deployment controller itself. This way, multiple instances of the deployment controller 122 will not cause redundancy of these jobs. One example type of task that the worker pod 132 performs is to monitor the buffer pool of unassigned environments to identify environments that have gone stale (e.g. environments that never go into a running status). The worker pod 132 then instructs that these be terminated or renewed. The worker pod 132 can also monitor environment pools to ensure that there are always environments in an unassigned pool 144, based on the settings for an environment cluster 140 (e.g., enforce a minimum threshold number of unassigned environments). The worker pod 132 can also periodically gather the metrics for each environment and updates the metrics in the database 108.

The event router 134 consumes messages and performs required tasks. It also listens to database change streams and reacts to the changes as needed. The event router 134 consumes status update messages produced by the environment monitors 154 of environment clusters 140. These messages are result of the monitoring conclusions from the monitors 154. An environment monitor 154 starts monitoring an environment's deployment process as soon as the environment monitor 154 is notified of the environment being in a transition state such as provisioning, starting, stopping, or terminating. The environment monitor 154 concludes monitoring when it determines that an environment has reached a stable state like running, stopped or terminated. The event router 134 also communicates with the configuration module 152 in response to status changes in the database 108. The event router 134 listens to detect changes in the status information in the database 108. Each time an environment status change is detected, the event router 134 adds a status change message in a messaging queue specific to the environment cluster 140 the environment is hosted in. The message is then retrieved from the messaging queue by the configuration module 152 in the environment cluster 140, and the configuration module 152 acts on the message to make changes to environments and assignments as needed.

The message broker 136 provides message queues to enable message passing (e.g., bi-directional communication) between the management cluster 120 and the environment clusters 140. The messages can be stored in queues (e.g., first-in-first out queues, priority queues, etc.) until components in the clusters retrieve the messages (e.g., by an event router or configuration module 152 taking action to "pop" the next message off its queue of incoming messages).

The deployment controller 122 and other components also access a deployment controller database 108, which stores information about the status of the various computing environments the system 110 hosts. The database 108 includes information about the various environment clusters 140, the users and user accounts, and individual environments. With this information, the deployment controller 122 has information that identifies each of the existing environment clusters 140, as well as describes their characteristics, such as their load levels, capacity, geographic locations, and more. The deployment controller 122 can monitor the capacity usage and load of the different environment clusters 140 and apply rules and policies to adjust how multiple environment clusters 140 are used. For example, the deployment controller 122 can distribute incoming requests to balance the computing load on the different environment clusters 140 (e.g., CPU usage, RAM usage, etc.) and/or to balance the number of active environments hosted by the different environment clusters 140. As another example, the deployment controller 122 can set a limit for the number of environments hosted for each environment cluster 140. The system 110 can allocate a new environment cluster 140 from cloud computing resources in response to determining that a condition is met, such as a particular environment cluster 140 has met or exceeded a threshold number of environments currently deployed (e.g., created or active), or that collectively a set of environment clusters 140 has reached a threshold number of environments.

The limits and thresholds for each environment cluster 140 can be set separately, based on the performance requirements, hardware allocation, and other properties of the clusters 140. For example, the characteristics of each environment cluster 140 (e.g., desired performance level, number of CPUs, amount of memory, amount of storage space, etc.) can be stored in the database 108. The parameters for each environment cluster 140, such as the size of the unassigned environment pool, the maximum number of concurrent environments allowed, etc., can be set and stored for each environment cluster individually based on its characteristics.

The system 110 may also include functionality to monitoring environment clusters 140 and instruct the formation of new environment clusters 140. In some implementations, this functionality resides outside the deployment controller 122, as a higher level of management that monitors environment clusters 140 across multiple deployment controllers 122, and may be operated in cooperation with the load balancer 112 that distributes tasks among different deployment controllers 122. A limit can be set for the number of environments that any single environment cluster 140 can host (e.g., a maximum of 50, or 100, etc.). When the number of active or total environments being hosted reaches a maximum limit for an environment cluster 140, the system 110 may instruct a new environment cluster 140 for the geographic region to be created, with its own configuration module, environment monitor, and pool of unassigned environments. This can be done proactively, rather than reactively, to maintain the benefits of a sufficient reserve of available unassigned environments. For example, if an environment cluster 140 has a limit of 100 environments, and there are 90 active assigned environments and 10 unassigned environments that can still be used, the deployment controller 122 can still instruct a new environment cluster 140 to be created, to create reserve capacity before it is needed. Similarly, the system 110 may initiate creation of a new environment cluster 140, to be managed by a particular deployment controller 122 instance, when the overall available capacity across multiple environment clusters 140 for that deployment controller 122 falls below a threshold, such as below 10% (e.g., if more than 900 environments have been created on a set of ten environment clusters 140 that have a maximum of 100 environments each). As another example, another cluster 140 may be allocated, or the resources to existing clusters 140 may be increased, in response to computing load on one or more environment clusters 140 exceeds a threshold (e.g., exceeding 85% predetermined CPU utilization, or exceeding a predetermined amount of memory usage, etc.).

The deployment controller 122 can include logic to select which environment cluster 140 is most appropriate for the geographic location of a user. For example, based on information about a user in the database 108 that indicates a country or locality of the user, the deployment controller 122 can select an environment cluster 140 that best fits (e.g., is closest to) the location of the user. In addition, the deployment controller 122 can instruct that the new computing environment be provided with locality settings (e.g., language, formatting, security settings, etc.) and rules that are appropriate for the location.

When a request for a new computing environment is received through the API 138, the deployment controller 122 selects one of the available environment clusters 140 to create and host the new environment. The deployment controller 122 then hands the task on to software running in the selected environment cluster 140 to complete the request. This can include sending instructions that the deployment controller 122 generates based on the request received, characteristics of the user or user account that are determined from information in the database 108, and so on.

Each environment cluster 140 has an environment management namespace 150 in which a configuration module 152 and environment monitor 154 operate. The configuration module 152 receives instructions from the deployment controller 122 and from the worker pod 132. Requests made through the API 138 are handled by logic of the deployment controller 122 or potentially through functionality of the API 138 itself. The worker pod 132 performs background tasks and scheduled tasks. The worker pod 132 can periodically check the number of unassigned environments that have been created, and the worker pod 132 can initiate creation of new environments for the unassigned environment pool when needed according to configuration settings stored in the database 108. As an example of handling API requests, after an API request for a new environment is received, the deployment controller 122 can send instructions to the configuration module 152 to create an environment or assign an existing unassigned environment to provide a new computing environment in the environment cluster 140. The instructions can specify various parameters for the new environment, such as the user or user account, data sources to connect to the environment, locality settings, the type of content of environment to create, and so on. The instructions may be sent in a variety of ways, such as through messages in a messaging queue managed by the message broker 136, through data stored in the database 108 which triggers the event router 134 to send a message through the message broker 136, a direct message through other channels, etc. The configuration module 152 then handles creation of the new computing environment. The configuration module 152 can be made automatically and independently scalable (e.g., to increase computing resources allocated to it) to handle potential spikes in the volume of environment creation and management requests received.

The environment monitor 154 handles events, functions and jobs related to monitoring environment status, so that multiple instances of the configuration module 152, if needed, will not cause redundancy of the monitoring. In general, the environment monitor 154 monitors environment namespaces when in a transition state (e.g., provisioning, stopping, starting, terminating). The environment monitor 154 receives and processes messages signifying environment status has changed to a transition state. The environment monitor 154 also produces status update messages when an environment reaches a stable state (e.g., running, stopped, terminated). When an environment entry is added to the DB (new environment) or has its status changed, the event router 134 puts a message on a environment-cluster-specific queue. The monitor 154 listens for messages on its environment cluster's queue. When a new message is received, the monitor 154 parses the message to determine the status. If it is a non-terminal (e.g., transition) status, then the monitor 154 calls the monitor function to 'watch' the environment until it reaches a desired state (e.g., from provisioning to running).

The environment cluster 140 is a set of processing nodes that host the computing environments for various tenants. In FIG. 1A, there is a set of active environments 143 that includes two environments 141a, 141b that are assigned to and configured for different tenants of the system. The environments 141a, 141b are running and can respond to requests from clients over the network 105.

The environments 141a, 141b are container-based, and each includes a set of multiple containers that interact to provide one or more applications or server functions. In each environment 141a, 141b, the set of containers provides a separate collection of the containers for an enterprise data processing platform, such as a business intelligence system that can perform functions such as generate reports, process queries, generate visualizations, and so on. In the example, each set of containers includes a main container, a document library container, an application server container, a web server container, and a telemetry container. These form a base set of containers that the enterprise platform relies on to operate. The containers may depend on each other to function properly. For example, the application server container may depend on the library container being present and operating.

Each active environment 141a, 141b has a corresponding persistent storage volume 145a, 145b that can store user data and environment state information. The persistent storage volumes 145a, 145b can store the state of each container of the environments 141a, 141b to enable each to be restarted if it is stopped or unloaded.

In some implementations, each environment 141a, 141b is created in a separate namespace, and in a different namespace than one used for the configuration module 152. The separate namespaces allow distinct sets of names or identifiers, so names or identifiers between namespaces do not conflict. In addition, each namespace can attach authorization and policies (e.g., access control, security policies) to the contents. The objects in one namespace are generally hidden from other namespaces to isolate the different created environments from each other. However, the configuration module 152 and environment monitor 154 can have full access to the namespaces of the different environments to carry out their management functions.

As shown in FIG. 1A, each computing environment 141a, 141b has multiple containers, with dependencies among them for the environment as a whole to operate correctly. The configuration module 152 can have access to software images 156 for the different containers, which the configuration module 152 can load into separate containers to generate the environments. However, even with the software images 152 available, the process of creating and configuring an environment can take significant amounts of time.

To reduce the delay that a user experiences upon requesting an environment, the configuration module 152 maintains an unassigned environment pool 144. This pool holds unassigned environments 142a, 142b that are executing (or are created and paused but are ready to execute), but which have not yet been assigned to or customized for a specific tenant. When a request for an environment is received, the configuration module 152 updates one of these unassigned environments 142a, 142b with customizations for the user and can quickly provide access to the user.

In more detail, the computer system pre-generates the unassigned environments, without needing any prior request for an environment from a user. The unassigned environment pool 144 can be managed by the worker pod 132, which can periodically check the number of unassigned environments that are allocated (e.g., present in the pool 144) using status information in the database 108. The worker pod 132 periodically compares the number of number of unassigned environments in the pool 144 with a reference, such as a minimum threshold number of environments set by configuration data in the database 108. The worker pod 132 has the responsibility of maintaining the pool 144 populated with the minimum number of unassigned environments. When the worker pod 132 determines that the pool 144 has fewer than the desired minimum number of unassigned environments, the worker pod 132 creates requests to the configuration module 152 to create an appropriate number of new unassigned environments to replenish the pool 144 up to the predetermined minimum number. In this process, the configuration module 152 in the environment cluster 140 is a passive actor that simply responds to requests from other actors in the system, specifically, the deployment controller 122 and the worker pod 132.

The worker pod 132 can be configured to maintain at least a minimum number of unassigned environments in the pool 144, such as 5, 10, 15, etc. The worker pod 132 checks the size of the pool 144 periodically (e.g., every minute, or every 5 minutes, or every 15 minutes, etc.) and automatically instructs the configuration module 152 to generates enough new unassigned environments to provide the predetermined minimum number. As a result, as unassigned environments are assigned to tenants and updated to join the set of active environments 143, the worker pod 132 causes the configuration module 152 to generate new unassigned environments to replenish the pool 144 up to at least the minimum threshold number. In some implementations, the worker pod 132 or the configuration module 152 may be configured to initiate the creation of a new unassigned environment for the pool 144 each time an environment is assigned to join the set of active environments 143, as an alternative mechanism to cause the pool 144 to be automatically replenished.

In some implementations, the operation of the worker pod 132 and the configuration module 152 automatically manages the unassigned environment pool 144 and creates new unassigned environments independent of and without needing any instructions from the deployment controller 122, so that the process is abstracted from and transparent to the deployment controller. In other implementations, the deployment controller 122 may be notified of and may track the status of the unassigned environments, and may instruct changes in the number of environments that are created or maintained, including as part of load balancing among the environment clusters.

The set of software images 156 can serve as a template for new environments. Each new environment can begin with containers based on the same set of software images 156 to provide the minimum baseline level of functionality for the environments. To create a new unassigned environment, the configuration module 152 creates a new namespace, creates the predetermined set of containers for the baseline set of environment functionality, loads the software image 156 for each container, and runs the containers. The configuration module 152 then configures the containers to provide any dependencies and links between containers or external elements that may be needed. This can include adding drivers, addresses, configuration settings, and other updates to enable the newly created environment to access third-party cloud computing storage, authentication systems (e.g., OpenID Connect (OIDC)), database systems, and so on. Once the configuration of the environment has been set, the environment monitor 154 also runs tests on the new environment. These tests can include, for example, tests for the presence and correct function of different modules or interfaces, tests for stability of the environment, performance tests, and tests to check that references such as uniform resource locators (URLs) resolve properly. In some implementations, the main container incorporates information about the dependencies among the containers and needed resources and so provides information that the environment monitor 154 uses to perform testing of the environment as a whole.

After the unassigned environments 142a, 142b are created and tested, the unassigned environments 142a, 142b remain in the pool 144, unassigned but ready to be assigned and made accessible to a user. The unassigned environments 142a, 142b remain in this state waiting until needed to respond to instructions from the deployment controller 122. The unassigned environments 142a, 142b can be maintained in an idle or paused state while they wait to be assigned. The database 108 contains records of the existence of the unassigned environments in the pool 144 as well as their status. The status is checked by the deployment controller 122, which decides to either assign an existing unassigned environment or create a new environment based on user requests.

Once the instructions are received from the deployment controller 122 to create a new environment, the configuration module 152 updates one of the unassigned environments 142a, 142b, for example, by linking it to the user identify or user account of the user that requested it. This can include actions such as updating the authentication settings for the user requesting the environment and making connections to enable the new environment to a user's data sets or data sources. Other parameters received in the instructions are also applied. Because the customization process starts with an unassigned environment that was previously loaded, configured, run, and tested, the amount of time needed to update the environment for a specific user is minimal. In many cases, a new environment can be provided only seconds or minutes after a user's request, which can be several orders of magnitude faster than the full deployment process without using pre-generated environments.

During the deployment process and afterward, the environment monitor 154 monitors the status of active environments 141a, 141b as well as of new environments that are in the process of being deployed from the unassigned environments 142a, 142b. The environment monitor 154 sends status messages in response to changes in the status of any of the environments in the environment cluster 140. The message broker 136 in the management cluster 120 receives the status messages from environment monitors 154 of all of the different environment clusters 140 that may be used. The event router 134 pulls messages from the message broker 136 and determines appropriate actions based on the messages. For example, the status updates can be used to update the information in the database 108, to provide updated status information to the user through the user interface 103, to trigger additional instructions from the deployment controller 122 to address conditions detected, to update the status information used to perform load balancing, and so on.

Figure 1B:
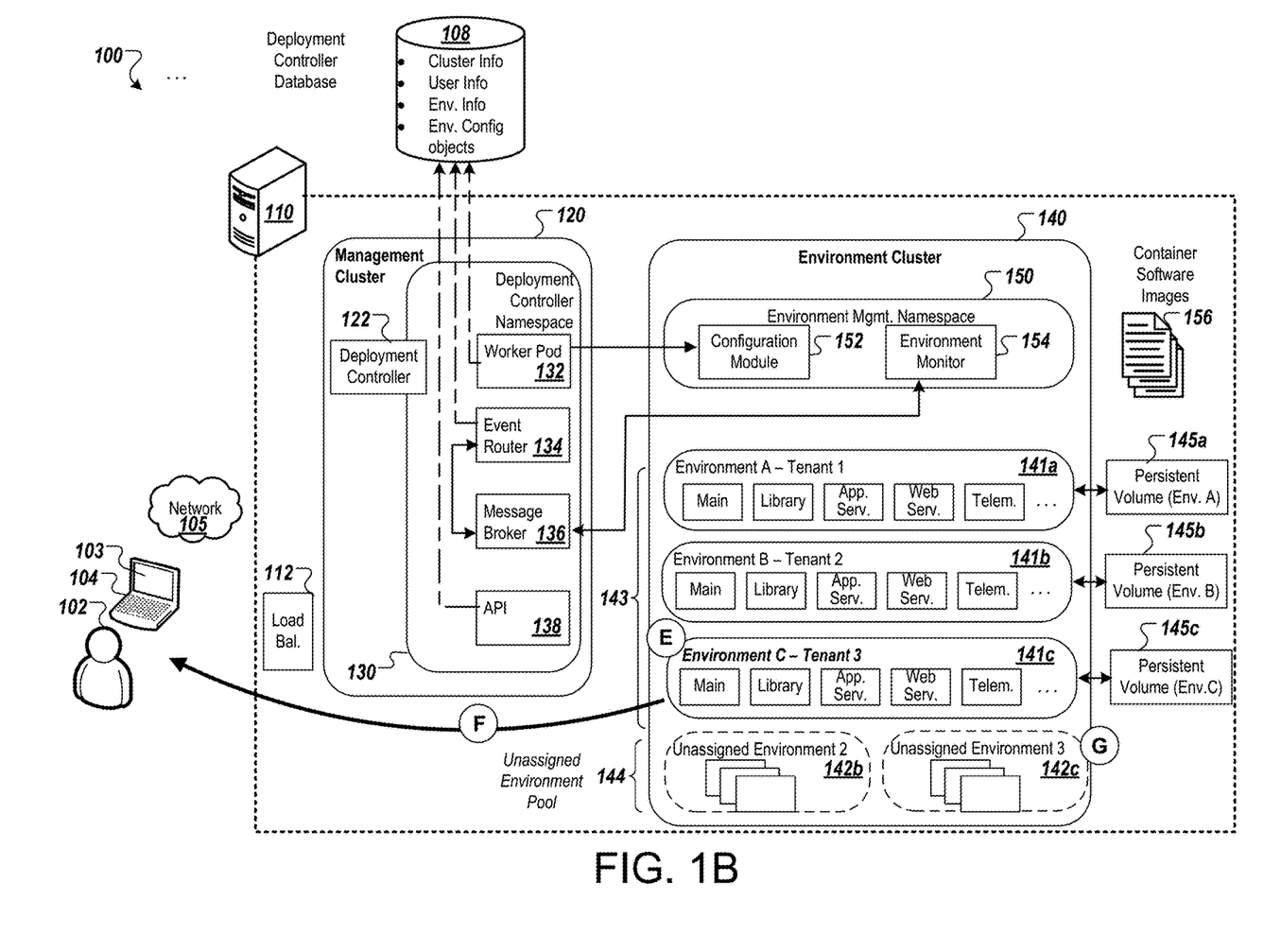
Figure 2:
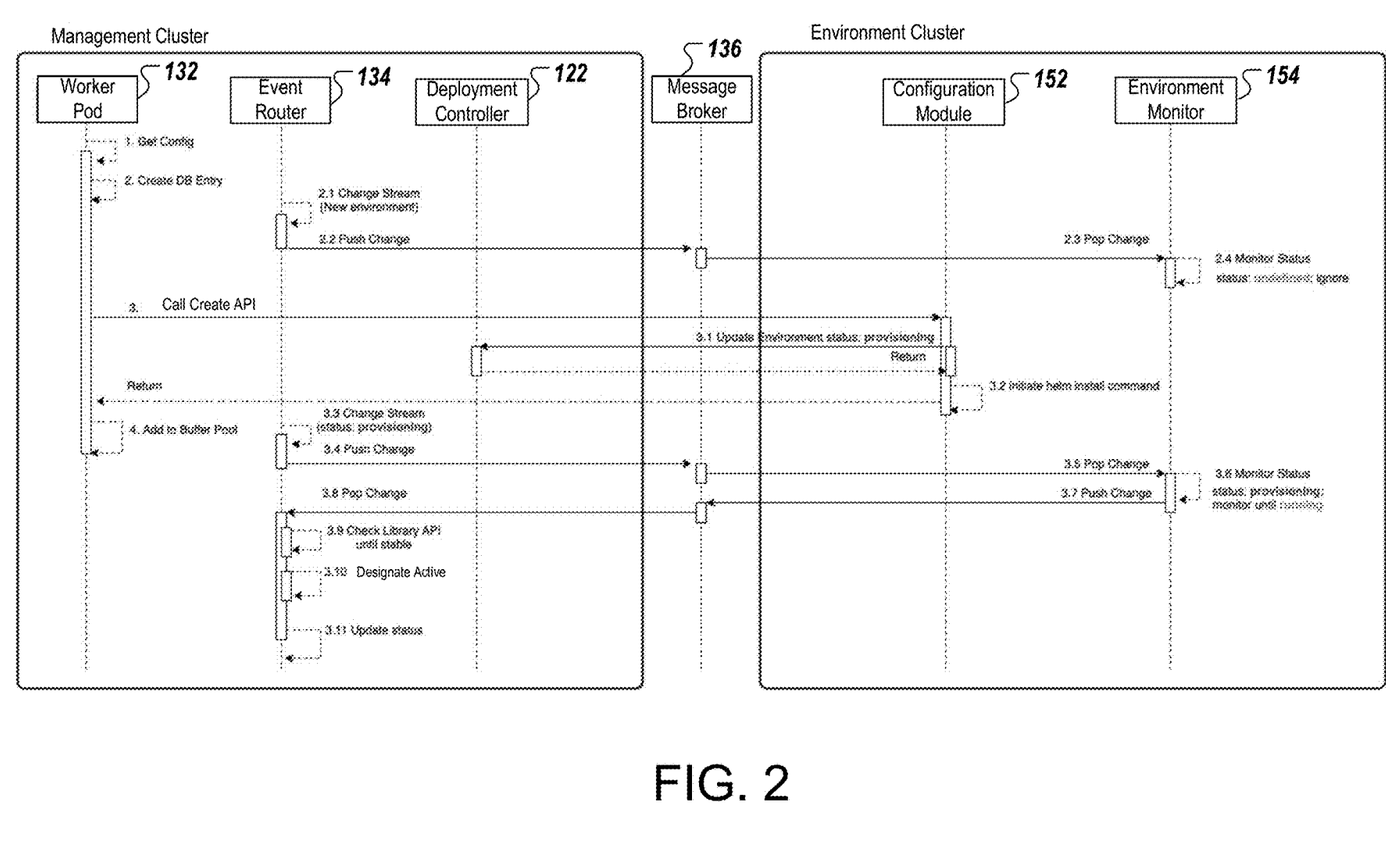
FIG. 2 is diagram illustrating an example of interactions to create an environment.

FIGS. 1A-1B show a simplified flow of information in the system 110 that enables a new environment to be created and deployed very rapidly for the user 102. These operations are illustrated as a series of stages (A) through (F). A more detailed example of interactions to deploy a new environment for the unassigned pool 144 is illustrated in FIG. 2.

Referring to FIG. 1A, in stage (A), the user 102 interacts with the user interface 103, which initiates a request 160 through the API 138 to create a new environment for the user 102. The request 160 can be reviewed by a load balancer 112 or other component to appropriately route it to the deployment controller 122. In some implementations a single deployment controller 122 can be used, as a global controller of all environment clusters 140 for the system 110. Nevertheless, in other implementations, there may be multiple deployment controllers 122 in the system 110, whether within the same management cluster 120 or in different management clusters, each with their own environment clusters 140 that they manage.

In stage (B), the deployment controller 122 interprets the request 160 for a new environment. The API sends updates to the database 108 to indicate the new request 160. The deployment controller 122 selects an environment cluster 140 (e.g., from among multiple environment clusters 140) to host the new environment. The deployment controller 122 can use a user identifier associated with the request 160 to retrieve information about the user from the database 108, and then select the environment cluster 140 that best fits the user's location. Similarly, the deployment controller 122 can select the environment cluster 140 to balance processing load and the number of active or assigned environments among multiple environment clusters 140.

In stage (C), in response to the request 160, the deployment controller 122 sends instructions 162 to the configuration module 152 of the selected environment cluster 140. The deployment controller 122 can send the instructions 162 as a configuration request sent directly to the configuration module 152. The instructions 162 instruct the configuration module 152 to configure a new environment for the user, and can include parameters for the new environment. For example, if the system 110 is configured to deploy multiple types of environments (e.g., environments having different sets of functionality, environments based on different sets of containers and software images, etc.), the parameters can specify which type of environment to deploy. Other settings can be provided, such as the locality of the user, an identification of data sets or features needed in the new environment (e.g., a set of applications to provide, third-party systems to support communication with, data sets to import), etc.

The deployment controller 122 has multiple options for obtaining a new environment for a user in response to the request 160, including assigning an environment from the unassigned pool 144 to the user 102 or instructing a new environment to be created for the user 144 separate from those in the unassigned pool 144. Assigning an environment from the unassigned pool 144 and applying any further customization or further configuration the user 102 may need is much faster than having to perform the entire process of creating an environment. The example of FIGS. 1A-1B, shows the deployment controller 122 providing the user 102 an environment using the assignment technique to provide the environment very soon after the request 160. This process of assigning an existing unassigned environment to the user 102 is a synchronous process. Often, the environment is obtained with simply an API call to an application container to configure authentication and access privileges to authorize the user to access the application. This can be done using OpenID Connect, which is an identity layer on top of the Open Authentication (OAuth) protocol. Since the installation of the application, provision of dependencies, and testing have been performed prior to the request 160 (e.g., in deployment of the unassigned environment into the unassigned pool 144), the operations to enable user access to a functional, running cloud-computing environment can be performed very quickly.

In stage (D), the configuration module 152 receives the instructions 162 and identifies an unassigned environment 142a that provides the appropriate type of environment needed to carry out the instructions 162. If multiple types of environments are created and deployed by the system 110, then the configuration module 152 may have pools of unassigned environments for each of the different types of environments to be deployed, each with a corresponding minimum to provide a reserve ready to allocate for the different environment types.

Referring to FIG. 1B, in stage (E) the configuration module 152 updates what was previously unassigned environment 142a to be assigned as environment 141c for the user 102. The configuration module 152 makes various configuration updates as discussed below, which can customize the configuration of the environment 141c further for the user that requested the environment. As discussed above, the unassigned environments in the pool 144 can wait in a "running" state, with all of the containers needed for each environment to operate loaded and executing prior to assignment to any customer, user, or account. As a result, the unassigned environment can be used directly without needing its operating status to be changed. Information about the status and assignment of the environments is maintained in the database 108. When an environment is first assigned (e.g., moves from being unassigned to being assigned), a flag in the environment information in the database 108 is set to indicate that the environment is now assigned, which designates that it is part of the set of assigned environments 143 and is no longer in the unassigned environment pool 144. The newly assigned environment 141c can begin accepting interactions over the network 105.

The environment 141c originally has a default service account, which was the default user account previously set when the environment was still unassigned. The configuration module 152 updates the authentication management for the environment 141c and grants the user 102 privileges to be able to access the environment 141c, including to manage and control the environment 141c. If the user has identified an account of the user 102 for a third-party cloud computing storage provider, the environment 141c can be updated to use (e.g., connect to and transfer data to and from) that account also. If the user 102 is a new user, the configuration module 152 creates a new user account, which can include creating a new account for the user 102 with one or more third-party cloud computing resource providers (e.g., for cloud compute, cloud data storage, etc.).

The various parameters in the instructions 162 are applied to the newly assigned environment 141c. If the parameters of the instructions 162 indicate that application features are needed beyond the base set of features provided by the default set of containers, the configuration module 152 can begin those updates and changes. Nevertheless, the base set of functionality of the environment 141c can still be provided to the user in the meantime while additional containers and other functionality are loaded. The configuration module 152 also allocates a persistent storage volume 145c to store the state data for the environment 141c and to provide persistent storage for the environment 141c to use. The persistent storage volumes 145a-145c are each logically separated from each other, with a different volume for each assigned environment.

The process of obtaining an environment in response to the request 160 can be performed by the deployment controller 122 in a synchronous or asynchronous manner. In the synchronous version, as shown in FIGS. 1A-1B, the deployment controller 122 instructs that an unassigned environment be assigned for the user 102. The deployment controller 122 waits for the assignment of the environment 141c to finish, and then the deployment controller 122 updates the database 108 to indicate the changes (e.g., designating the environment 141c as being assigned, designating the user 102 or account it is assigned to, etc.). In this series of operations, the operating status of the environment 142a/141c does not change during assignment: the environment 142a/141c was running while in the unassigned pool and remains running when assigned and updated for access by the user 102. In this case, where the operating status of the environment does not change, the environment monitor 154 is not needed.

An alternative option for obtaining an environment is an environment creation process that asynchronous with respect to the deployment controller 122, where the deployment controller 122 or the worker pod 132 initiates the creation of a new environment but only ensures that the process of environment creation was started. Environment creation is then performed by the configuration module 152. In some cases, the API may provide different commands so a user may specify the creation of a new environment rather than the assignment of an existing environment in the pool 144 if desired. The worker pod 132 also creates new environments to replenish the pool 144 as needed, and an example of this is shown in FIG. 2.

During the process of converting the unassigned environment to the newly active and assigned environment 141c, the environment monitor 154 detect changes in the status of the deployment and sends messages with those status updates to the deployment controller through the message broker 136.

In stage (F), with the environment 141c running and updated for the user 102, the system 110 provides the user 102 access to the environment. By deploying the environment 141c as discussed above, the delay between the initial request 160 and providing access to the configured, running server environment 141c is very low. The environment 141c is hosted by and has computing resources (e.g., disk storage, RAM, processor, etc.) allocated from the environment cluster 140. Accordingly, it is ready to receive and respond to requests over the network 105, serve content, and perform the other functions it was designed to perform. The environment monitor 154 can notify the deployment controller 122 when the deployment of the environment 141c is completed. In response, the deployment controller 122 can inform the user 102 with a notification, an e-mail message, an update to the user interface 103 of an application or web application, or other communication.

The communication from the system 110 can include data enabling the user 102 to access the new environment 141*c*. In some implementations, this data is provided in the form of a reference, such as a hyperlink, URL, or user interface control, that the user can select to access the environment 141*c*. In some implementations, the new environment 141*c* can be made active and automatically added to a management interface, e.g., listed on the user interface 103, for the user 102 to further configure and interact with the environment 141*c*. Once the environment 141*c* is created, the user 102, as an administrator, may assign other users to interact with the new environment 141*c* and further customize the environment's behavior.

In stage (G), the worker pod 132 determines that an additional environment is needed for the unassigned environment pool 144. For example, during a periodic check of environment information in the database 108, the worker pod determines that the number of environments in the unassigned pool (e.g., only one after the assignment for the user 102) is less than the predetermined minimum for the environment cluster 140 (e.g., a minimum of two in this example). In response, the worker pod 132 instructs the configuration module 152 create a new unassigned environment 142*c* in order to replenish the unassigned environment pool 144 to the minimum level desired.

FIG. 2 is diagram illustrating an example of interactions to create an environment for the unassigned or "buffer" pool of environments 144. The figure shows interactions among various components of the system of FIGS. 1A-1B. FIG. 2 shows a series of major steps as integers 1 through 4. Other steps that aren't integer values (e.g., 2.2, 3.4) happen asynchronously between the integer steps, and are shown in approximate order for readability.

The process in FIG. 2 can be performed after the worker pod 132 has determined the need to create a new environment, e.g., to replenish the unassigned environment pool 144. To do this, the worker pod 132 can access configuration information about the current operating status and assignments of running environments. This can be performed as part of a scheduled task to check configuration information. In some cases, the worker pod 132 may determine, based on the status information, that the number of unassigned environments is less than a desired minimum number.

Once the worker pod 132 has determined that a new environment is needed, in step 1, the worker pod 132 creates or retrieves, from the database 108, a data object that contains default configuration information for the environment that is about to be created. A template or base set of default configuration information can be stored, and this default configuration information can be applied to create new unassigned environments. Based on the default configuration information, a separate configuration object is created for each environment. In other words, a copy or instance of the default configuration is created and designated as corresponding to the new environment to be created. The database 108 stores the configuration objects for the various environments in a configuration pool. Having a distinct configuration object (e.g., set of configuration settings) for each environment helps mitigate errors and minimize server downtime as it avoids dependency of the environments on a shared configuration object. In addition, the configuration object for each environment can be updated with environment-specific information, including information generated by third-party services (e.g., a SalesForce server, an OIDC application, cloud computing data storage provider account information, etc.), which is unique for each environment and is linked to the environment by the environment identifier (e.g., environment name).

In step 2, the worker pod 132 creates an entry in the database 108 indicating the updated configuration information it obtained. The database 108 can maintain an environments list that includes information such as an environment name, authentication information and so on. The database update can also indicate that a new environment is needed to replenish the unassigned pool 144.

In step 2.1, the event router 134 detects a change based on an update to the database 108. In this instance, the event router 134 detects that a new environment is requested.

In step 2.2, the event router 134 pushes a change message indicating the new needed environment to the message queue for the environment cluster 140 where the environment will be created.

In step 2.3, the environment monitor 154 pops the change message from the message queue, and in step 2.4, it begins to monitor the status of the new environment. Since the new environment has not been created, the status is undefined, so the monitor 154 ignores the result.

In step 3, the worker pod 132 calls an environment creation API to instruct the configuration module 152 to begin deploying the new environment needed to replenish the unassigned pool 144.

In step 3.1, the configuration module 152 updates the environment status for the new environment to "provisioning." That status update is provided to the deployment controller 134 and can be stored in the database 108.

In step 3.2, configuration module 152 initiates the install command to begin the creation of a new environment. This may be performed using a script that is run using a package manager, such as Helm for Kubernetes. The install command can cause a packaged application or script to be run, which causes pre-configured application resources to be deployed. In this case, the full series of environment creation actions can be initiated, such as creating a new namespace for the environment, creating new containers from software images 156, running the containers, and so on.

In step 3.3, the event router 134 router detects the change to database 108 that set the environment status of "provisioning" in step 3.1. The event router 134 pushes a status change message to message queue provided by the message broker 136.

In step 3.5, the environment monitor pops the status change message from the message queue. The environment monitor 154 begins to monitor the status of the new environment. Initially, the status is "provisioning," and the environment monitor 154 continues monitoring until the status is "running." Once the new status is detected, in step 3.7 the environment monitor 154 pushes a status change message to the message queue where it is popped off the queue by the event router 134.

In step 3.9, the event router 134 checks a Library API of the environment until the API is stable. For example, the event router 134 can send messages periodically until the API functions as expected by returning proper acknowledgements and/or results. The Library API can be an API providing access to documents in a database or other repository through a web-based interface. Additionally or alternatively, the API can support interactions of a file server, database server, data analytics server, and so on, and so may be configured to enable users to request and retrieve documents from a private database of document collection, send queries and receive results, and more. In some implementations, different from what is illustrated, the checks of the Library API are performed by the environment monitor 154 at an earlier stage of the process. For example, the environment monitor 154 can perform the testing and verification that APIs are functioning and available as part of step 3.6, so that the environment monitor 154 does not signal that the environment is running and available for use until the APIs are verified to be operating properly.

In step 3.10, the event router 134 designates the new environment as active and available. In step 3.11, the event router 134 updates the status of the environment in the database 108.

In step 4, the worker pod 132 adds the new environment to the unassigned environments pool 144. This designates the new environment as available to be updated and rapidly deployed in response to user requests through the API 138.

Figure 3:
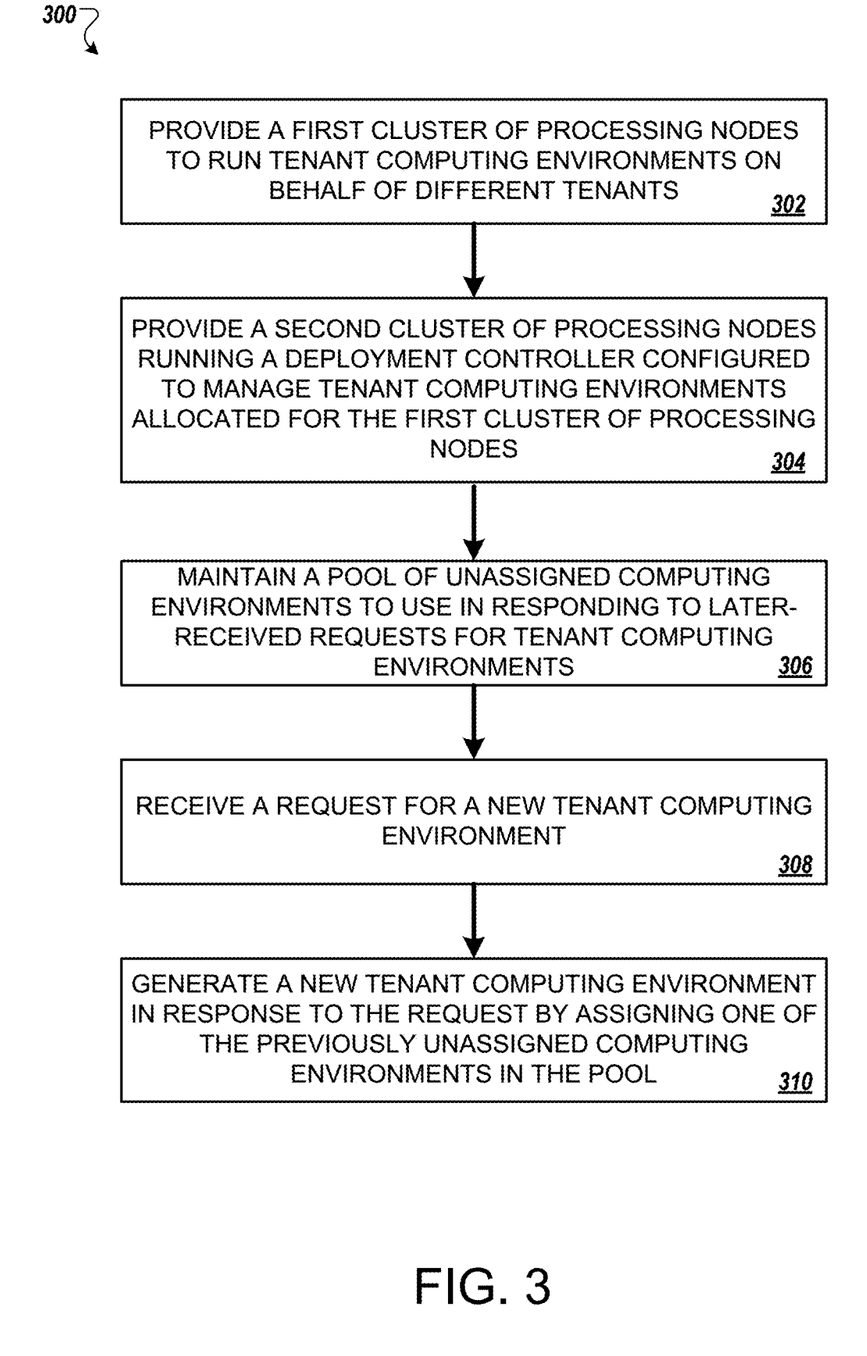
FIG. 3 is a flow diagram illustrating an example of a process for deploying computing environments.

FIG. 3 is a flow diagram that illustrates an example of a process 300 for deploying a computing environment. The process 300 can be performed by one or more computers, such as by the system 110 discussed above.

The process 300 includes providing a first cluster of processing nodes configured to run tenant computing environments on behalf of different tenants (302). For example, the environment cluster 140 can host assigned environments 141a, 141b as well as unassigned environments 142a, 142b.

The process 300 includes providing a second cluster of processing nodes running a deployment controller configured to manage and monitor tenant computing environments allocated for the first cluster of processing nodes (304). For example, the management cluster 120 can host the deployment controller 122 and other supporting elements 132, 134, 136, 138.

The process 300 includes maintaining a pool of unassigned computing environments to use in responding to later-received requests for tenant computing environments, the unassigned computing environments being hosted in the first cluster of processing nodes (306). For example, the unassigned environment pool 144 maintains environments that are created in advance, which wait in a readily executable state (e.g., running, idle, or paused).

The process 300 includes receiving a request for a new tenant computing environment, the request being provided over a communication network to the deployment controller through an application programming interface (API) (308). For example, the message 160 is received using the API 138, and the message 160 indicates that a new environment is needed for the user 102.

The process 300 includes generating a new tenant computing environment in response to the request (310). The deployment controller running in the second cluster of processing nodes coordinates with one or more modules running in the first cluster of processing nodes. For example, the deployment controller 122 can instruct the configuration module 152 that a new environment be allocated in response to the user request. The deployment controller 122 determines whether the request from the user can be fulfilled by assigning an environment from the unassigned environment pool 144. If so, the deployment controller 122 can make a call is directly to the configuration module 152 to assign that user to a specific unassigned environment. The deployment controller 122 marks the environment as assigned, which has the effect of removing that assignment from the unassigned environment pool 144. As a result, the system 110 assigns one of the unassigned computing environments as the new tenant computing environment in response to the request. An example is shown in FIG. 1B, where the previously unassigned environment 142b has been assigned and run as assigned environment 141c.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
    providing, by the one or more computers, a first cluster of processing nodes configured to run tenant computing environments on behalf of different tenants;
    providing, by the one or more computers, a second cluster of processing nodes running a deployment controller configured to manage tenant computing environments allocated for the first cluster of processing nodes;
    maintaining, by the one or more computers, a pool of unassigned computing environments to use in responding to later-received requests for tenant computing environments, the unassigned computing environments being hosted in the first cluster of processing nodes;
    receiving, by the one or more computers, a request for a new tenant computing environment, the request being provided over a communication network to the deployment controller through an application programming interface (API);
    generating, by the one or more computers, a new tenant computing environment in response to the request, wherein the deployment controller running in the second cluster of processing nodes coordinates with one or more modules running in the first cluster of processing nodes to assign one of the unassigned computing environments is made available as the new tenant computing environment in response to the request;
    determining, by the one or more computers, a number of unassigned computing environments available;
    based on a comparison of the number of unassigned computing environments with a predetermined minimum threshold number, determining, by the one or more computers, that the number of unassigned computing environments is less than the predetermined minimum threshold number; and
    in response to determining that the number of unassigned computing environments is less than the predetermined minimum threshold number, generating, by the one or more computers, a number of additional unassigned computing environments to increase the number of unassigned computing environments to meet or exceed the predetermined minimum threshold number, each of the additional unassigned computing environments being generated to include contents of a same set of software images.

2. The method of claim 1, wherein the tenant computing environments operate in separate namespaces in the first cluster of processing nodes, and wherein each environment includes a separate instance of application software of the environments.

3. The method of claim 2, wherein each of the unassigned computing environments includes a same set of multiple containers, wherein, in each of the unassigned computing environments, the set of multiple containers is configured to operate together to provide one or more applications.

4. The method of claim 3, wherein the containers of the respective unassigned computing environments in the pool are maintained in running state or paused state until assigned to become tenant computing environments.

5. The method of claim 1, comprising providing, in response to the request, a reference specifying an address providing access to the new tenant computing environment.

6. The method of claim 1, comprising:
monitoring a number of unassigned computing environments are available in the first cluster of processing nodes; and
based on the monitoring, generating one or more additional unassigned computing environments to maintain at least a minimum number of unassigned computing environments available.

7. The method of claim 1, wherein the unassigned computing environments have each been configured with dependencies meet to enable the unassigned computing environments to access one or more third-party systems or interfaces.

8. The method of claim 1, comprising:
running a configuration module in the first cluster of processing nodes, the configuration module being configured to receive instructions generated by the deployment controller in response to requests the deployment controller received through the API; and
running a monitoring module in the first cluster of processing nodes along with one or more tenant computing environments, the configuration module being configured to monitor computing environments in the first cluster of processing nodes and provide status information about the computing environments to the deployment controller.

9. The method of claim 8, wherein the deployment controller manages multiple different first clusters of processing nodes, each of the first clusters hosting a different set of computing environments, and each of the first clusters running its own configuration module and monitoring module for managing computing environments within the first cluster.

10. The method of claim 1, wherein generating the new tenant computing environment comprises updating a particular environment of the unassigned computing environments by:
assigning to the particular environment a user account for a user associated with the request; and
adding one or more links to a data source associated with the user.

11. A system comprising:
one or more computers; and
one or more computer-readable media storing instructions that are operable, when executed by the one or more computers, to perform operations comprising:
providing, by the one or more computers, a first cluster of processing nodes configured to run tenant computing environments on behalf of different tenants;
providing, by the one or more computers, a second cluster of processing nodes running a deployment controller configured to manage tenant computing environments allocated for the first cluster of processing nodes;
maintaining, by the one or more computers, a pool of unassigned computing environments to use in responding to later-received requests for tenant computing environments, the unassigned computing environments being hosted in the first cluster of processing nodes;
receiving, by the one or more computers, a request for a new tenant computing environment, the request being provided over a communication network to the deployment controller through an application programming interface (API);
generating, by the one or more computers, a new tenant computing environment in response to the request, wherein the deployment controller running in the second cluster of processing nodes coordinates with one or more modules running in the first cluster of processing nodes to assign one of the unassigned computing environments is made available as the new tenant computing environment in response to the request;
determining, by the one or more computers, a number of unassigned computing environments available;
based on a comparison of the number of unassigned computing environments with a predetermined minimum threshold number, determining, by the one or more computers, that the number of unassigned computing environments is less than the predetermined minimum threshold number; and
in response to determining that the number of unassigned computing environments is less than the predetermined minimum threshold number, generating, by the one or more computers, a number of additional unassigned computing environments to increase the number of unassigned computing environments to meet or exceed the predetermined minimum threshold number, each of the additional unassigned computing environments being generated to include contents of a same set of software images.

12. The system of claim 11, wherein the tenant computing environments operate in separate namespaces in the first cluster of processing nodes, and wherein each environment includes a separate instance of application software of the environments.

13. The system of claim 12, wherein each of the unassigned computing environments includes a same set of multiple containers, wherein, in each of the unassigned computing environments, the set of multiple containers is configured to operate together to provide one or more applications.

14. The system of claim 13, wherein the containers of the respective unassigned computing environments in the pool are maintained in running state or paused state until assigned to become tenant computing environments.

15. The system of claim 11, wherein the operations comprise providing, in response to the request, a reference specifying an address providing access to the new tenant computing environment.

16. The system of claim 11, wherein the operations comprise:
- monitoring a number of unassigned computing environments are available in the first cluster of processing nodes;
- based on the monitoring, generating one or more additional unassigned computing environments to maintain at least a minimum number of unassigned computing environments available.

17. The system of claim 11, wherein the unassigned computing environments have each been configured with dependencies meet to enable the unassigned computing environments to access one or more third-party systems or interfaces.

18. One or more non-transitory computer-readable media storing instructions that are operable, when executed by one or more computers, to cause the one or more computers to perform operations comprising:
- providing, by the one or more computers, a first cluster of processing nodes configured to run tenant computing environments on behalf of different tenants;
- providing, by the one or more computers, a second cluster of processing nodes running a deployment controller configured to manage tenant computing environments allocated for the first cluster of processing nodes;
- maintaining, by the one or more computers, a pool of unassigned computing environments to use in responding to later-received requests for tenant computing environments, the unassigned computing environments being hosted in the first cluster of processing nodes;
- receiving, by the one or more computers, a request for a new tenant computing environment, the request being provided over a communication network to the deployment controller through an application programming interface (API);
- generating, by the one or more computers, a new tenant computing environment in response to the request, wherein the deployment controller running in the second cluster of processing nodes coordinates with one or more modules running in the first cluster of processing nodes to assign one of the unassigned computing environments is made available as the new tenant computing environment in response to the request; and
  - determining, by the one or more computers, a number of unassigned computing environments available;
  - based on a comparison of the number of unassigned computing environments with a predetermined minimum threshold number, determining, by the one or more computers, that the number of unassigned computing environments is less than the predetermined minimum threshold number; and
  - in response to determining that the number of unassigned computing environments is less than the predetermined minimum threshold number, generating, by the one or more computers, a number of additional unassigned computing environments to increase the number of unassigned computing environments to meet or exceed the predetermined minimum threshold number, each of the additional unassigned computing environments being generated to include contents of a same set of software images.

\* \* \* \* \*